(12) United States Patent
Iwakawa et al.

(10) Patent No.: US 8,145,755 B2
(45) Date of Patent: Mar. 27, 2012

(54) TERMINAL, TERMINAL MANAGEMENT APPARATUS AND METHOD THEREOF FOR ENABLING MANAGEMENT OF TERMINALS INCLUDING BASED ON ASSOCIATION TO EACH OTHER

(75) Inventors: Akinori Iwakawa, Kawasaki (JP); Satoshi Okuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 997 days.

(21) Appl. No.: 11/192,143

(22) Filed: Jul. 29, 2005

(65) Prior Publication Data

US 2006/0230448 A1   Oct. 12, 2006

(30) Foreign Application Priority Data

Mar. 25, 2005 (JP) ................ 2005-089228

(51) Int. Cl.
*G06F 15/173* (2006.01)
(52) U.S. Cl. ...................... 709/225; 709/223
(58) Field of Classification Search .......... None
See application file for complete search history.

(56) References Cited

U.S. PATENT DOCUMENTS

| | | | | |
|---|---|---|---|---|
| 5,887,136 A * | 3/1999 | Yasuda et al. | ................ | 709/204 |
| 2004/0187152 A1* | 9/2004 | Francis et al. | ................ | 725/58 |
| 2006/0208063 A1* | 9/2006 | Patel et al. | ................ | 235/380 |

FOREIGN PATENT DOCUMENTS

| | | |
|---|---|---|
| JP | 9-62597 | 3/1997 |
| JP | 11-288402 | 10/1999 |

OTHER PUBLICATIONS

Samir Ghamri-Doudane et al: "Hierarchical Policy Based Management Architecture to Support the Deployment and the Discovery of Services in Ubiquitous Networks" Computational Systems Bioinformatics Conference, 2004 IEEE Tampa, FL USA Nov. 16-18, 2004, pp. 126-133.*
Ghamri-Doudane S. et al (hereinafter Ghamri) ("Hierarchical policy based management architecture to support the deployment and the discovery of services in ubiquitous networks", Nov. 2004, p. 126-133, submitted by applicant as prior art).*

(Continued)

*Primary Examiner* — George Neurauter
*Assistant Examiner* — Cheikh Ndiaye
(74) *Attorney, Agent, or Firm* — Staas & Halsey LLP

(57) ABSTRACT

A ubiquitous communication system that can be used without changing a user ID etc. of a terminal of others or causing problems such as information leakage is provided. A terminal management apparatus for managing terminals on a ubiquitous communication system is provided with a terminal management portion for retaining information about terminals belonging to each of the users, a parent registration list in which a terminal that another user is allowed to use and the another user who is allowed to use the terminal are pre-registered, a child registration list in which a terminal borrowable from another user and the another user to which the terminal belongs are pre-registered, and an association setting portion for, when a first user makes an association setting request on a terminal belonging to a second user, referring to the lists and, if it is judged that the first user may be allowed to use the terminal belonging to the second user, registering the terminal belonging to the second user in the terminal management portion of the first user.

8 Claims, 8 Drawing Sheets

OTHER PUBLICATIONS

Ghamri-Doudane, S., et al., "Hierarchical Policy Based Management Architecture to Support the Deployment and the Discovery of Services in Ubiquitous Networks", Computational Systems Bioinformatics Conference, 2004. CSB 2004. Proceedings. 2004 IEEE Tampa, FL, USA Nov. 16-18, 2004, Los Alamitos, CA, USA IEEE (Comput. Soc, US, Nov. 16, 2004), pp. 126-133.

Wenbi, Rao, et al., "Design of an Open and Secure Ubiquitous Computing System", Web Intelligence, 2004. WI 2004. Proceedings. IEEE/WIC/ACM International Conference on Beijing, China Sept. 20-24, 2004, Piscataway, NJ, USA, IEEE, Sep. 20, 2004, pp. 656-659.

European Search Report, dated Aug. 3, 2006, in European Application No. P104252EP00/ECR.

Japanese Office Action issued on Feb. 3, 2009 in corresponding Japanese Patent Application 2005-089228.

* cited by examiner

FIG. 7A

| Child registration list | 13 |
|---|---|
| Connectable child user | Connectable other terminal |
| User B | Mobile phone |

FIG. 7B

| Parent registration list | 12 |
|---|---|
| Openable parent user | Openable own terminal |
| User A | Mobile phone |

TERMINAL, TERMINAL MANAGEMENT APPARATUS AND METHOD THEREOF FOR ENABLING MANAGEMENT OF TERMINALS INCLUDING BASED ON ASSOCIATION TO EACH OTHER

BACKGROUND OF THE INVENTION

1. Field of the Invention

The present invention relates to a ubiquitous computing that provides a computer environment using various instruments at hand instead of user-specific instruments. In particular, the present invention relates to a terminal on a ubiquitous communication system and a terminal management apparatus for managing the same.

2. Description of Related Art

Studies have been conducted on so-called ubiquitous computing, in which a computer environment utilized by an individual user and various services given thereby, for example, sending and receiving e-mails, reserving and purchasing tickets of various types, are provided by instruments at hand instead of user-specific instruments.

There is also an ongoing study of a ubiquitous communication system that applies this concept of ubiquitous computing to communication instruments and combines a plurality of communication instruments such as mobile phones, facsimile machines and the like, thereby providing a communication function (see JP 9(1997)-62597 A, for example). Further, a system has been suggested in which a videophone function is provided by using a television and a video camera as a video transmitter-receiver and a mobile phone as an audio transmitter-receiver.

SUMMARY OF THE INVENTION

However, such a ubiquitous communication system has the following problems.

Information instruments including communication instruments usually are owned or managed by a specific individual or company. Therefore, in the case where a user of the ubiquitous communication system carries out communications utilizing a communication instrument at hand, this user temporarily borrows the communication instrument belonging to another user.

In such cases, in order to cause the borrowed terminal to operate as his/her own terminal, for example, capable of handling originating and arriving calls with respect to his/her telephone number, it is necessary to set authorization information or connection information such as a user ID or a server address to this terminal. Accordingly, there are various problems such as setting that is troublesome to a user, complicated user interface and possible leakage of authorization information.

With the above-noted problems in mind, it is an object of the present invention to provide a ubiquitous communication system that can be used without changing a user ID etc. of a terminal of others or causing problems such as information leakage.

In order to achieve the above-mentioned object, a terminal management apparatus according to the present invention is a terminal management apparatus for managing terminals on a ubiquitous communication system, which allows a user to carry out a communication by borrowing a terminal belonging to another user, including a terminal management portion for retaining, for each of the users, information about terminals belonging to the each of the users, a parent registration list management portion for retaining information about a terminal that another user is allowed to use among the terminals belonging to the each of the users and the another user who is allowed to use the terminal, a child registration list management portion for retaining information about a terminal borrowable from another user and the another user to which the terminal belongs, and an association setting portion for, when a first user makes an association setting request on a terminal belonging to a second user, referring to the parent registration list management portion and the child registration list management portion and, if it is judged that the first user may be allowed to use the terminal belonging to the second user, registering information about the terminal belonging to the second user in the terminal management portion for the first user.

With this configuration, for each of the users, the information about terminals belonging to this user is pre-stored in the terminal management portion, the information about the terminal that another user is allowed to use among the terminals belonging to the each of the users and the another user who is allowed to use the terminal are pre-stored in the parent registration list management portion, the information about the terminal borrowable from another user and the another user to which the terminal belongs are pre-stored in the child registration list management portion. Based on this, when the first user makes the association setting request on a terminal belonging to the second user, the association setting portion refers to the parent registration list management portion and the child registration list management portion and, if it is judged that the first user may be allowed to use the terminal belonging to the second user, registers the information about the terminal belonging to the second user in the terminal management portion for the first user.

This makes it possible to execute communications by borrowing the other user's terminal to which a parent-child relationship has been preset, without changing an user ID or the like of this terminal. Further, presetting the parent-child relationship and the terminal to be opened (borrowed) between users is advantageous to the parent user in that privacy leakage such as tapping can be prevented and to the child user in that unauthorized use of resources in which the other user uses his/her communication instrument without permission can be suppressed.

Also, in the terminal management apparatus described above, it is preferable that the terminal management portion contains, as the information about the terminals belonging to the each of the users, a media information describing media communicable by each of the terminals, and that the terminal management apparatus further includes a call control portion that, taking a reception of an originating event from the first user as a cue, compares a media information of an originating terminal contained in the originating event and the media information in the terminal management portion, selects a terminal suitable as the originating terminal from among the terminals registered in the terminal management portion as the terminal belonging to the first user, and resets a call. Alternatively, it is preferable that the terminal management portion contains, as the information about the terminals belonging to the each of the users, a media information describing media communicable by each of the terminals, and that the terminal management apparatus further includes a call control portion for, when an update on the terminal management portion is detected after establishing the communication, referring to the media information in the terminal management portion at this time and selecting a suitable terminal from among the terminals registered in the terminal management portion as the terminal belonging to the first user, and resetting a call. With these configurations, the call control portion resets a call by optimizing the communication environment according to the medium to be used for communication, bringing an advantage of improving a communication efficiency and a user convenience.

Further, in the terminal management apparatus described above, it is preferable that a pre-created secret information is contained in the association setting request, the secret information is presented at a time of setting an association and compared with a stored secret information, thereby confirming that the association setting request is made by a proper terminal.

Also, in order to achieve the above-mentioned object, a terminal according to the present invention is a terminal managed by the terminal management apparatus having any of the above-described configurations, wherein the terminal includes a proximity sensing portion for sensing by a proximity wireless that the terminal and another terminal come close to each other and a request generating portion for, when the proximity sensing portion senses that the another terminal comes close, generating the association setting request containing instrument IDs obtained from the terminal and the another terminal and sending it to the association setting portion. As the proximity wireless, it is possible to use RFID or the like. With this configuration, when the terminals are brought close to each other, the instrument IDs of these terminals are obtained by the proximity wireless and sent to the terminal management apparatus so as to set the association, thereby making it possible to register the association between the terminals automatically.

BRIEF DESCRIPTION OF THE DRAWINGS

FIG. 7A illustrates an example of a child registration list registered in a terminal management module according to Embodiment 3, and FIG. 7B illustrates an example of a parent registration list.

DETAILED DESCRIPTION OF THE INVENTION

The following is a description of embodiments of the present invention, with reference to the accompanying drawings.

Embodiment 1

Figure 2:
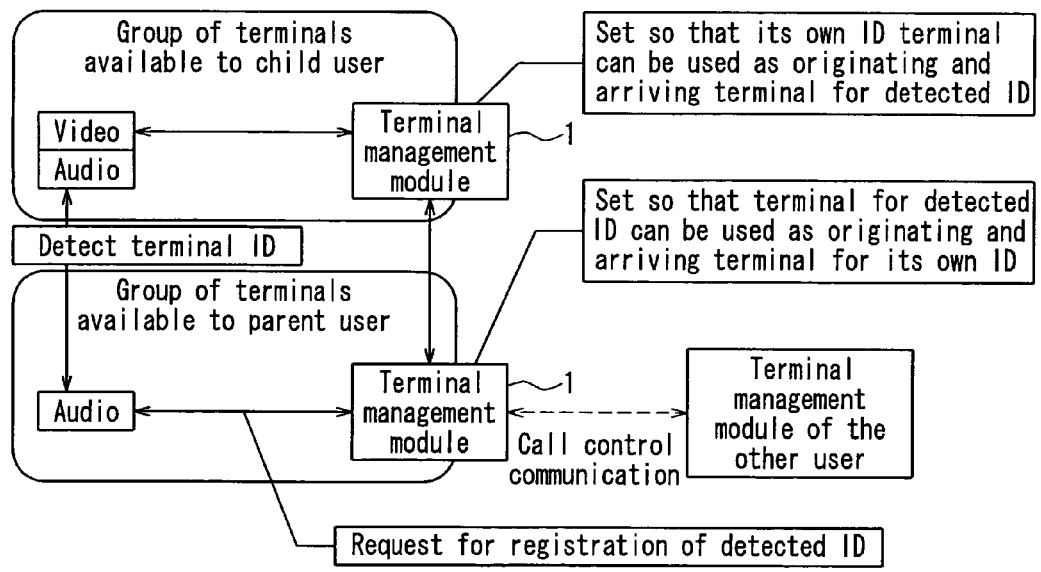
FIG. 2 is a block diagram schematically showing a basic configuration of a ubiquitous communication system according to Embodiment 1.

FIG. 2 is a block diagram schematically showing a basic configuration of a ubiquitous communication system according to an embodiment of the present invention. As shown in FIG. 2, in the ubiquitous communication system according to the present embodiment, for each user, a group of terminals available to this user is pre-registered. Then, a terminal management module 1 is provided for managing the group of available terminals. In other words, one terminal management module 1 is present for each user. The terminal management module 1 manages a relationship defined between terminals used by different users and restricts this setting so as to achieve a stable terminal borrowing and lending function between these different users. The terminal management module 1 is present in any terminals belonging to the group of terminals available to each user or in an instrument that is accessible from the group of available terminals (for example, a communication control instrument or a home server). In other words, the terminal or the instrument in which the terminal management module 1 is installed serves as an embodiment of the terminal management apparatus of the present invention.

In the ubiquitous communication system of the present embodiment, an association (a parent-child relationship) between users can be set for each terminal. In other words, when one user and the other user are "associated" for one terminal, it means that one user can borrow the terminal owned or managed by the other user. The association of the terminals is defined by setting a single user ID to two terminals. Thus, when seen from a specific user, there are two different associations with the other user, i.e., (1) the case of using the other user's terminal as his/her own terminal and (2) the case of allowing the other user to use his/her own terminal as the other user's terminal. In the case (1), this user is "parent," and the other is "child." Restricting the association (1) is useful for preventing privacy leakage such as tapping. In the case (2), this user is "child," and the other is "parent." Restricting the association (2) is useful for suppressing unauthorized use of resources in which the other user uses his/her communication instrument without permission.

As shown in FIG. 2, in the ubiquitous communication system according to the present embodiment, the terminal of a parent user and the terminal of a child user detect each other's instrument ID. The instrument ID is an identifier assigned to each terminal and contains a user ID of an owner (or a manager) of the terminal and a terminal ID of this terminal. The terminal ID is an identifier assigned specifically to each terminal and indicates a destination or a sender at the time of communication. The terminal management module 1 of the child user sets the association of terminals so that the terminal of the child user can be used as an originating and arriving communication terminal for the detected terminal ID of the parent user. The terminal management module 1 of the parent user sets the association of terminals so that the terminal for the detected terminal ID of the child user can be used as an originating and arriving communication terminal for its own terminal ID.

Figure 1:
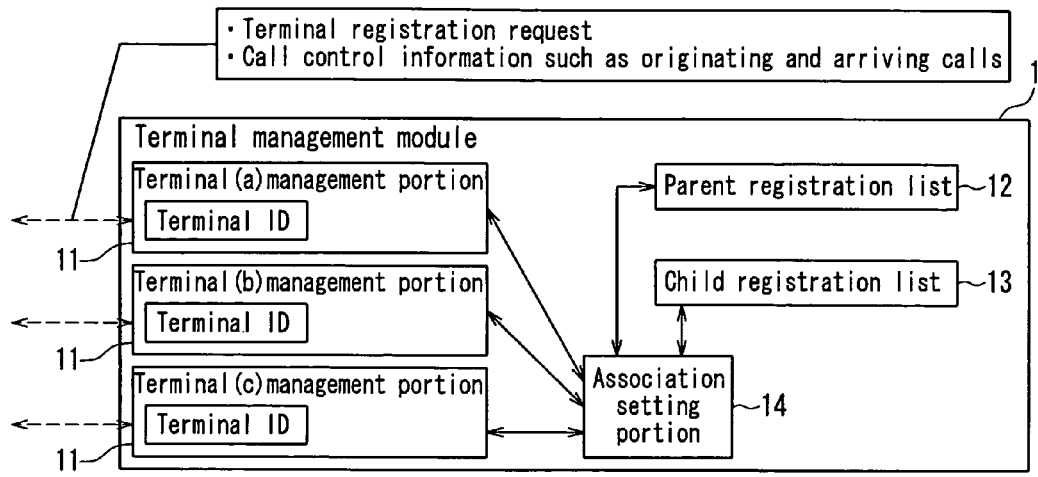
FIG. 1 is a block diagram showing a basic configuration of a terminal management module according to Embodiment 1 of the present invention.

In order to achieve such functions, the terminal management module 1 has an internal configuration as shown in FIG. 1. FIG. 1 is a block diagram showing a basic configuration of the terminal management module 1. The terminal management module 1 has a terminal management portion 11, a parent registration list 12, a child registration list 13 and an association setting portion 14. The terminal management portion 11 is present in each terminal included in the group of terminals available to the user. In the example illustrated by FIG. 1, there are three terminal management portions 11 corresponding to three terminals (a to c), which are not shown in the figure. The terminal management portion 11 has a function of retaining a terminal ID of each terminal and sending and receiving call control information such as a terminal registration request and originating and arriving calls between terminals having that terminal ID.

The association setting portion 14 receives the terminal registration request from the terminal management portion 11 and sets the association between the terminals. Although described later in detail referring to FIG. 3, the setting of the association between the terminals is completed by registering the child user's terminal in the parent user's terminal management module 1, namely, registering the terminal management portion 11 corresponding to that child user's terminal in the terminal management module 1. After the association between terminals is set in this manner, the parent user can carry out communications utilizing the registered child user's terminal in addition to his/her own terminal originally included in the group of available terminals.

Figure 3:
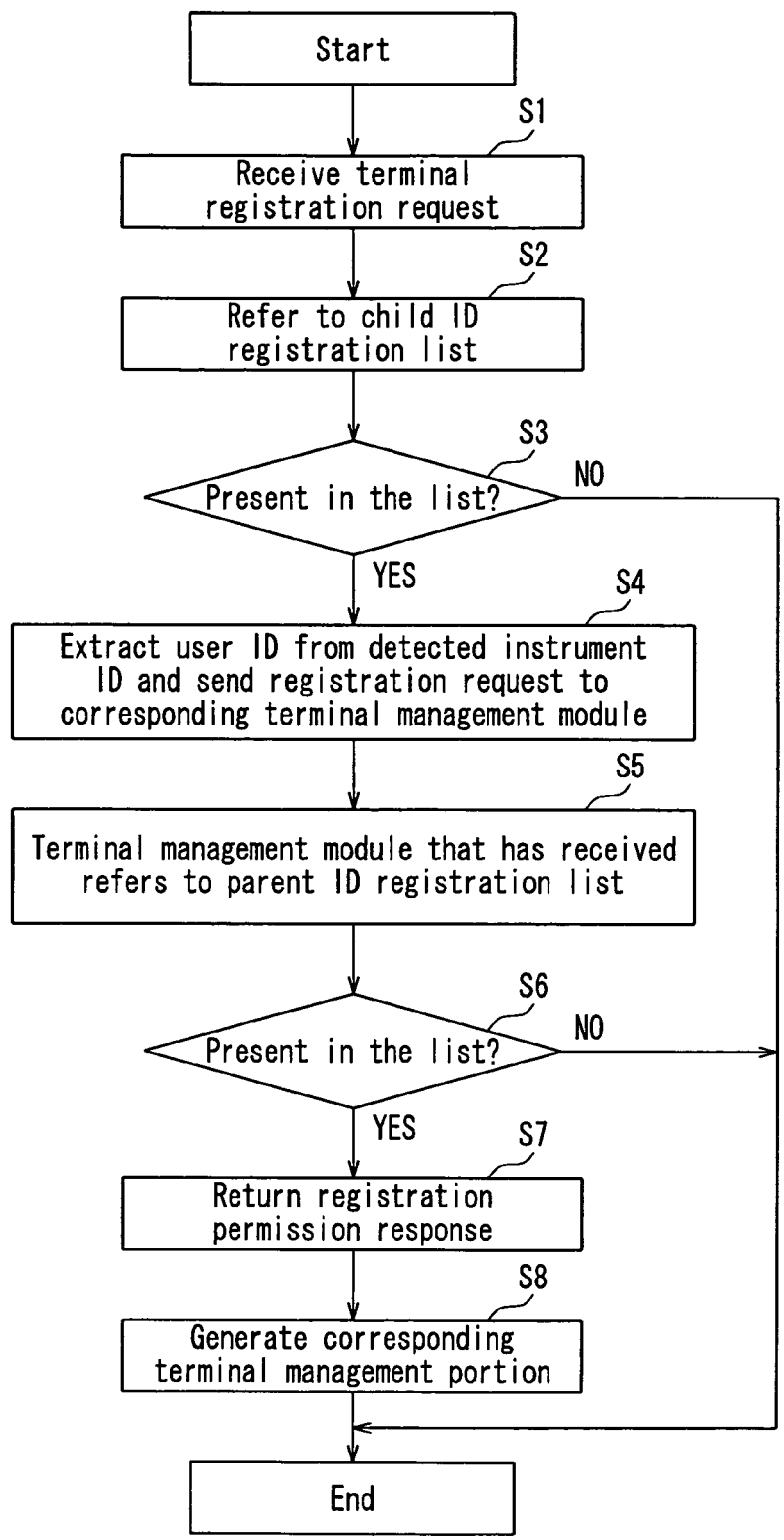
FIG. 3 is a flowchart showing a basic operation of a terminal management module provided in the ubiquitous communication system according to Embodiment 1.

FIG. 3 is a flowchart showing a basic operation of setting the association in the ubiquitous communication system in the present embodiment. In the present ubiquitous communication system, this operation of setting the association starts when a terminal of one user is brought close to a terminal of the other user and they detect each other's instrument ID. One of these two terminals sends a terminal registration request including a pair of the detected instrument IDs to the terminal management module 1 of this terminal. It is noted that which of these two terminals sends the terminal registration request can be determined according to any desired logic.

On receipt of the terminal registration request (S1), the terminal management module 1 refers to the child registration list 13 of this module (S2) and judges whether the terminal ID included in either of the pair of the instrument IDs is registered in the child registration list 13 (S3). If the above-noted terminal ID is present in the list (YES in S3), a user ID corresponding to this terminal ID is extracted from the instrument ID, and a registration request is sent to the terminal management module 1 of that user (S4). Then, the terminal management module 1 that has received the above-mentioned registration request refers to the parent registration list 12 (S5) and judges whether the terminal ID contained in the registration request is present in the list. If the above-noted terminal ID is present in the list (YES in S6), a registration permission response is returned to the terminal management module 1 that has originated the registration request in S4 (S7). Then, the terminal management module 1 that has received the registration permission response generates the terminal management portion 11 corresponding to a target terminal of the registration request and registers it in the terminal management module 1 (S8).

By the above-described operation, the ubiquitous communication system according to the present embodiment makes it possible to execute communications by borrowing the other user's terminal to which a parent-child relationship has been preset. Further, presetting the parent-child relationship and the terminal to be opened (borrowed) between users is advantageous to the parent user in that privacy leakage such as tapping can be prevented and to the child user in that unauthorized use of resources in which the other user uses his/her communication instrument without permission can be suppressed.

Embodiment 2

In the following, a ubiquitous communication system according to another embodiment of the present invention will be described with reference to the accompanying drawings. The ubiquitous communication system according to the present embodiment detects instrument IDs of a parent user and a child user by using a proximity wireless system including an RFID tag and an RFID reader or the like. Also, the ubiquitous communication system according to the present embodiment additionally registers a terminal to be borrowed from the child user as a terminal available to the parent user and then detects a change in a media environment of the parent user, thus optimizing a communication environment.

Figures 4, 5A, 5B:
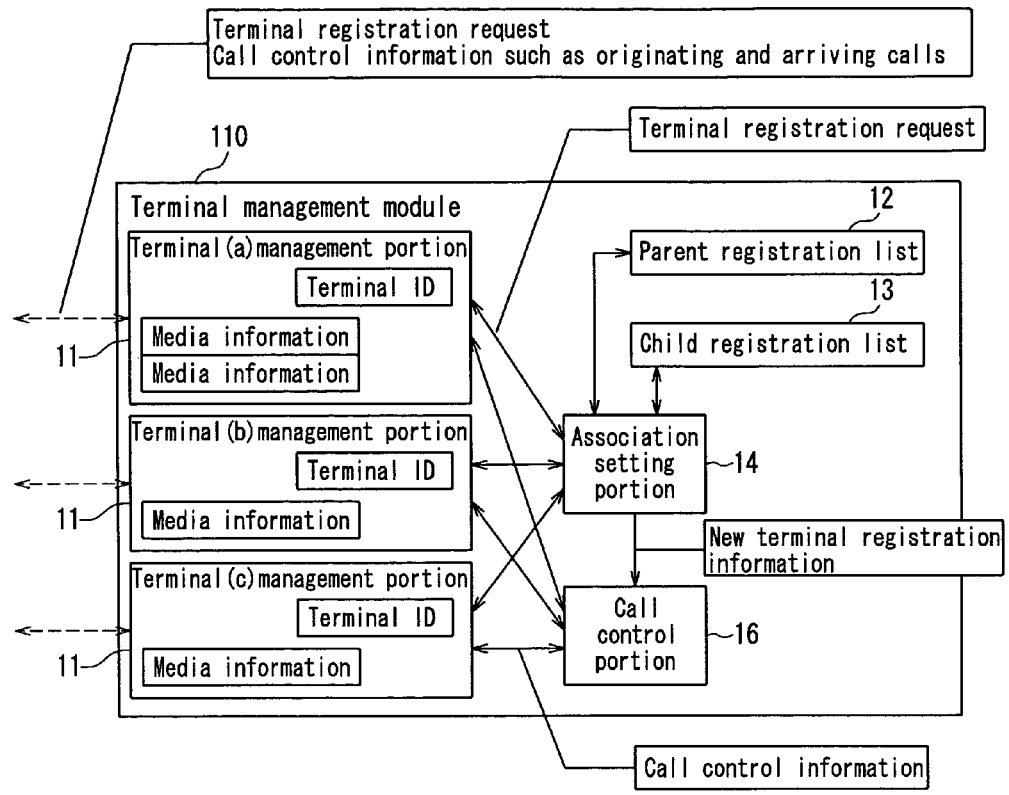
FIG. 4 is a block diagram showing a basic configuration of a terminal management module according to Embodiment 2.
FIG. 5A illustrates an example of a parent registration list registered in the terminal management module according to Embodiment 2.
FIG. 5B illustrates an example of a child registration list.

FIG. 4 is a block diagram showing a configuration of a terminal management module 110 provided so as to correspond to each user in the ubiquitous communication system according to the present embodiment. The terminal management module 110 further includes a call control portion 16 in addition to the configuration in the terminal management module 1 shown in FIG. 2. Also, the terminal management portion 11 of the terminal management module 110 has not only the terminal ID of the available terminal but also information about media (audio, video or the like) that can be handled by this terminal. Other than the above, the basic configuration and operation of the terminal management module 110 are similar to those of the terminal management module 1 described above.

In the following, referring to FIGS. 5 and 6, the operation of the ubiquitous communication system according to the present embodiment will be described based on a specific example. Here, a user A is at work in his/her seat provided with a videophone, and a videophone is registered in a group of terminals available to the user A. A user B is a business traveler who comes close to the user A, and a mobile phone is registered in a group of terminals available to the user B. A user C is in audio conversation with the user B. In other words, an audio session is established between the user C and the user B. In a group of terminals available to the user C, a videophone also is registered. In this state, the user B now borrows the videophone of the user A and attempts to add a video session with the user C. In other words, in this case, the user B is "parent," and the user A is "child."

Moreover, an agreement for allowing the user B to use the user A's videophone has been made in advance between the user A and the user B. Accordingly, as shown in FIG. 5A, in the parent registration list 12 of the terminal management module 110 of the user A, the user ID of the user B is registered as an openable parent user ID, and a terminal ID of this user's own videophone is registered as an openable own terminal ID. Furthermore, as shown in FIG. 5B, in the child registration list 13 of the terminal management module 110 of the user B, the user ID of the user A is registered as a connectable child user ID, and a terminal ID of the user A's videophone is registered as a connectable other terminal ID. Incidentally, although the contents of the registered user IDs and terminal IDs are shown in FIGS. 5A and 5B for facilitating understanding, the user IDs and the terminal IDs are strings of numeric or alphanumeric characters or an IP address set so as not to overlap in at least the ubiquitous communication system.

Figure 6:
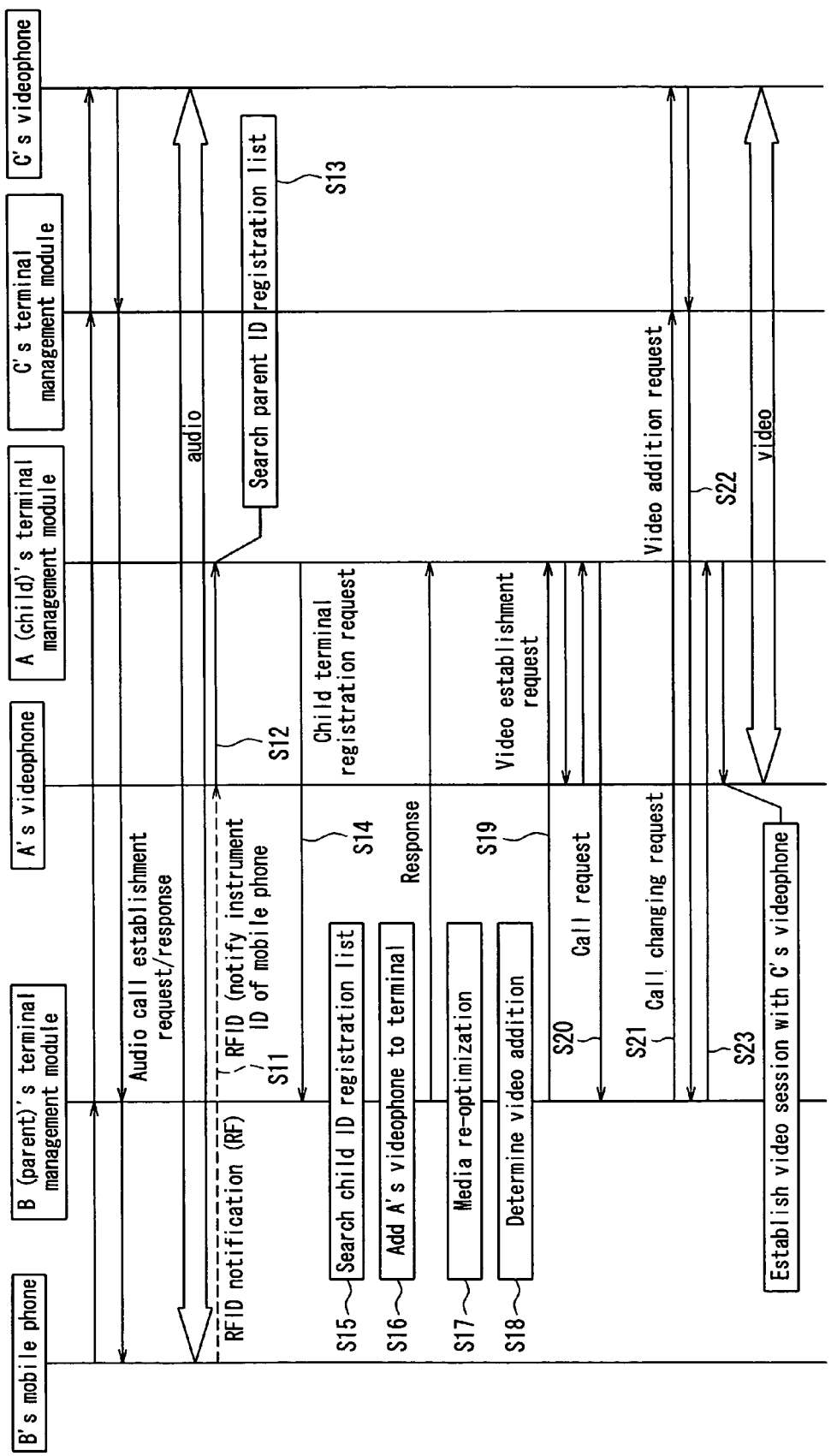
FIG. 6 is a chart showing an operation of a ubiquitous communication system according to Embodiment 2.

First, the user B notifies the user A's videophone of the instrument ID of his/her mobile phone (S11 in FIG. 6). This can be performed utilizing RFID as follows. In the user B's mobile phone, an RFID tag describing the instrument ID of this mobile phone is incorporated in advance. Also, the videophone is provided with an RFID reader. The user B brings his/her mobile phone close to the user A's videophone, whereby the RFID reader of the user A's videophone reads out the instrument ID of the user B's mobile phone. Incidentally, the instrument ID is constituted by a user ID and a terminal ID similarly to Embodiment 1.

Next, the user A's videophone forms a pair of the instrument ID of the user B's mobile phone read out by the RFID reader as described above and its own instrument ID and sends it to the terminal management module 110 of the user A (S12). Here, the terminal management module 110 of the user A sends the pair of these instrument IDs to the association setting portion 14 in this module. The association setting portion 14 refers to the parent registration list 12 and the child registration list 13 and judges whether each of the terminal IDs contained in these instrument IDs is registered in the parent registration list 12 or the child registration list 13 (S13). Here, as shown in FIG. 6A, in the parent registration list 12 of the terminal management module 110 of the user A, the user ID of the user B is registered as the openable parent user ID, and the terminal ID of the videophone is registered as the openable own terminal ID. Accordingly, the association setting portion 14 of the user A's terminal management module 110 determines that the user B (parent) may be allowed to use the videophone of the user A (child).

Subsequently, the terminal management module 110 of the user A issues a child terminal registration request to the terminal management module 110 of the user B (S14). The terminal management module 110 of the user B that has received this request refers to the child registration list 13 and judges whether the user A's videophone may be additionally registered in the group of terminals available to the user B (S15). In this case, since the registration has been made to the effect that the user B (parent) may be allowed to use the videophone of the user A (child) as shown in FIG. 5B, the association setting portion 14 of the terminal management module 110 of the user B generates the terminal management portion 11 corresponding to the user A's videophone and stores it in the terminal management module 110 of the user B (S16).

Thereafter, it becomes possible for the user B to use the user A's videophone as one of the terminals included in the user B's own group of available terminals.

Further, in the present embodiment, the association setting portion 14 of the terminal management module 110 of the user B requests the call control portion 16 to re-optimize a terminal environment (S17). On receipt of this, the call control portion 16 examines a medium that is used for an existing communication and refers to media information of all the terminal management portions 11 registered in the user B's terminal management module 110 at this time, thereby determining a medium available to the user B (S18). In this case, since the user A's videophone is newly registered as described above, it is determined that the video is available. However, what is established by then is an original audio session alone, and the video has not been used.

Accordingly, the call control portion 16 of the user B's terminal management module 110 sends a call request designating "video" to the user A's videophone (S19) and obtains a call request describing a connection condition (S20). Subsequently, the call control portion 16 of the user B's terminal management module 110 adds a media condition regarding the existing "audio" to this, generates a single call changing request and sends it to the user C, which is an existing communication partner (S21).

Since the videophone is originally included in the group of available terminals, the terminal management module 110 of the user C adds a video session according to the designated condition to this and returns a media condition on the side of the user C to the user B's terminal management module 110 in a call arrival response (S22).

In the user B's terminal management module 110, the media condition of "video" contained in the call arrival response is extracted and sent out as a response to the call request received from the user A's videophone (S23). In this way, a new video session is established between the user A's videophone and the user C's videophone.

As described above, in accordance with the present embodiment, it is possible to achieve a ubiquitous communication system capable of executing communications by borrowing the other user's terminal to which a parent-child relationship has been preset. Further, presetting the parent-child relationship and the terminal to be opened (borrowed) between users is advantageous to the parent user in that privacy leakage such as tapping can be prevented and to the child user in that unauthorized use of resources in which the other user uses his/her communication instrument without permission can be suppressed.

Moreover, in accordance with the present embodiment, since the instrument ID is detected between the parent user's terminal and the child user's terminal by utilizing the proximity wireless system such as RFID or the like, the user does not have to take any trouble to set the instrument ID manually. Furthermore, by additionally registering the terminal to be borrowed from the child user as the terminal available to the parent user and then detecting a change in the media environment of the parent user, thus optimizing the communication environment, it becomes possible to carry out communications in the optimized environment, bringing an advantage of improving a communication efficiency and a user convenience.

The present embodiment has illustrated an example in which the notification of the instrument ID is made by RFID between the terminal of the parent user and the terminal of the child user. However, how to pass the instrument ID between the terminals is not limited to the RFID. For example, the parent user may use a Web interface or the like to input the instrument ID, and the terminal management module of the child user may receive this.

Embodiment 3

Hereinafter, yet another embodiment of the present invention will be described.

The basic configuration of the terminal management module of the ubiquitous communication system according to the present embodiment is similar to that in Embodiment 2. Assuming a state in which audio and video communications are carried out between the user A's videophone and the user C's videophone, the following description is directed to the operation of the ubiquitous communication system according to the present embodiment in the case where the user A borrows the user B's mobile phone and attempts to carry out audio communication with the user C's videophone. In other words, in the present embodiment, the user A is "parent," and the user B is "child."

Now, similarly to Embodiment 2, a proximity sensing system by RFID is provided between the user B's mobile phone and the user A's videophone. Also, what is illustrated in FIG. 7A is registered in the child registration list 13 of the user A's terminal management module 110, and what is illustrated in FIG. 7B is registered in the parent registration list 12 of the user B's terminal management module 110.

Figure 8:
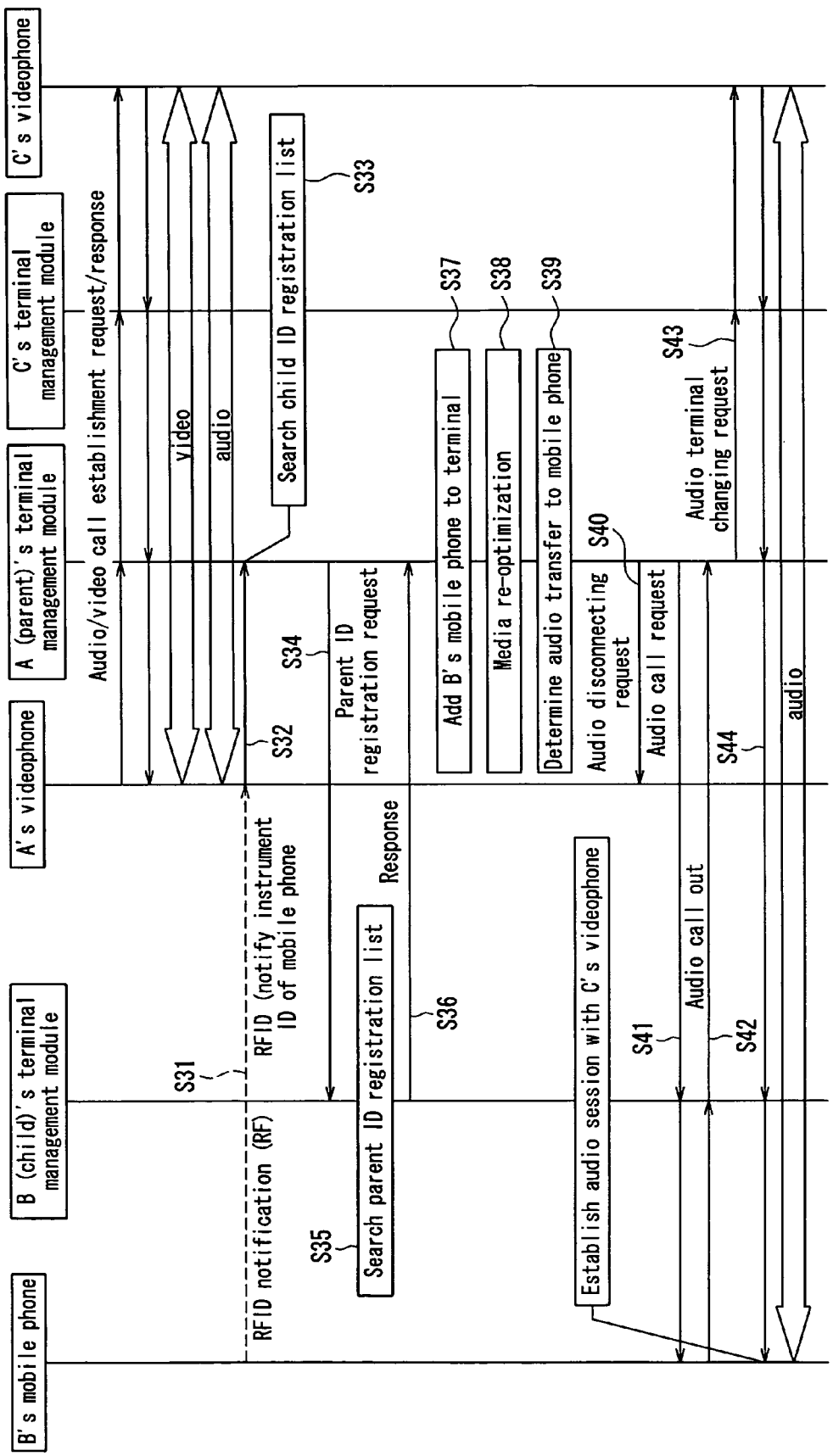
FIG. 8 is a chart showing an operation of a ubiquitous communication system according to Embodiment 3.

In this state, when the user A borrows the user B's mobile phone and brings it close to the user A's videophone, the user A's videophone reads out the instrument ID of the mobile phone by the RFID reader (S31 in FIG. 8). The user A's videophone forms a pair of the read-out instrument ID of the user B's mobile phone and its own instrument ID and sends it to the terminal management module 110 of the user A (S32). The terminal management module 110 of the user A sends this to the association setting portion 14. The association setting portion 14 refers to the child registration list 13 with respect to the received pair of the instrument IDs and judges whether it can be registered as a child terminal (S33). In this case, since the user B's mobile phone is on the child registration list 13 as the terminal available to the user A as shown in FIG. 7A, the registration is allowed.

Subsequently, the terminal management module 110 of the user A sends a parent registration request to the terminal management module 110 of the user B (S34). The terminal management module 110 of the user B refers to the parent registration list 12 (FIG. 7B) (S35) and, because it matches, sends a registration permission response (S36). The user A's terminal management module 110 that has received the registration permission response generates the terminal management portion 11 corresponding to the user B's mobile phone and stores it in the user A's terminal management module 110 (S37).

Thereafter, it becomes possible for the user A to use the user B's mobile phone as one of the terminals included in the user A's own group of available terminals.

The association setting portion 14 of the terminal management module 110 of the user A requests the call control portion 16 to re-optimize a terminal environment (S38). On receipt of this, the call control portion 16 examines a medium that is used for an existing communication and searches the group of terminals available to the user A at this time for an available medium (S39). In this example, the terminals available for audio communication in the group of terminals available to the user A are two terminals, namely, the user A's videophone and the user B's mobile phone. Thus, the call control portion 16 uses a desired logic such as presetting a priority to each of these terminals, for example, so as to select any of the terminals. In this case, the mobile phone is selected.

In this case, it is necessary to transfer the current audio session to the user B's mobile phone that the user A is borrowing. Therefore, the terminal management module 110 of the user A first sends a request of disconnecting the existing audio session to the user A's videophone (S40) and newly sends an audio call request to the user B's mobile phone (S41).

The terminal management module 110 of the user B receives this and sends an audio call request to the user B's mobile phone. The user B's mobile phone sends a call request describing a connection condition to itself (S42), and the user A's terminal management module 110 receives this.

The terminal management module 110 of the user A sends an audio connection condition changing request to the user C (S43), and the user C's videophone disconnects the existing audio session and returns a response describing a connection condition to itself (S44).

This response is finally sent to the user B's mobile phone, and an audio session is established between the user B's mobile phone and the user C's videophone.

As described above, in accordance with the present embodiment, when the terminals are brought close to each other, the instrument IDs of these terminals are sent to the terminal management module so as to set the association, thereby making it possible to register the association between the terminals automatically.

Embodiment 4

Figure 9:
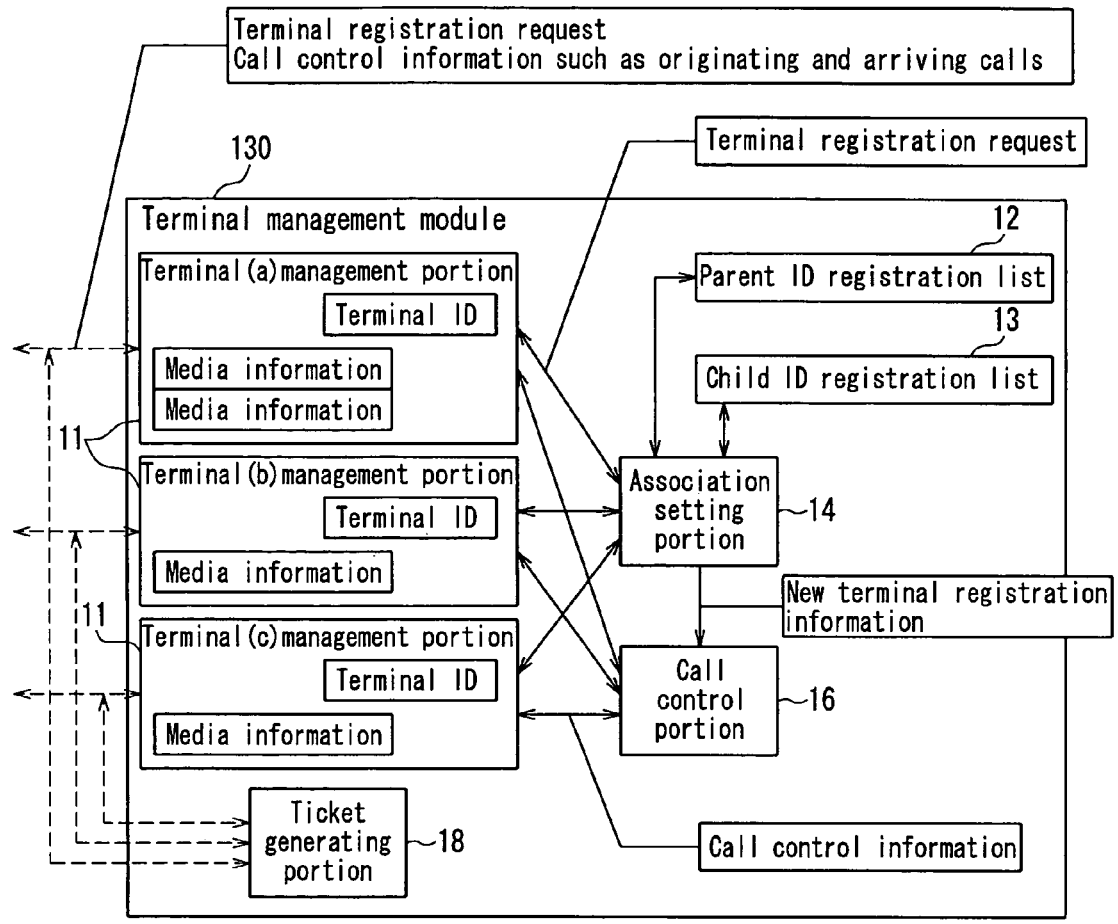
FIG. 9 is a block diagram showing a basic configuration of a terminal management module provided in a ubiquitous communication system according to Embodiment 4 of the present invention.
Figure 10:
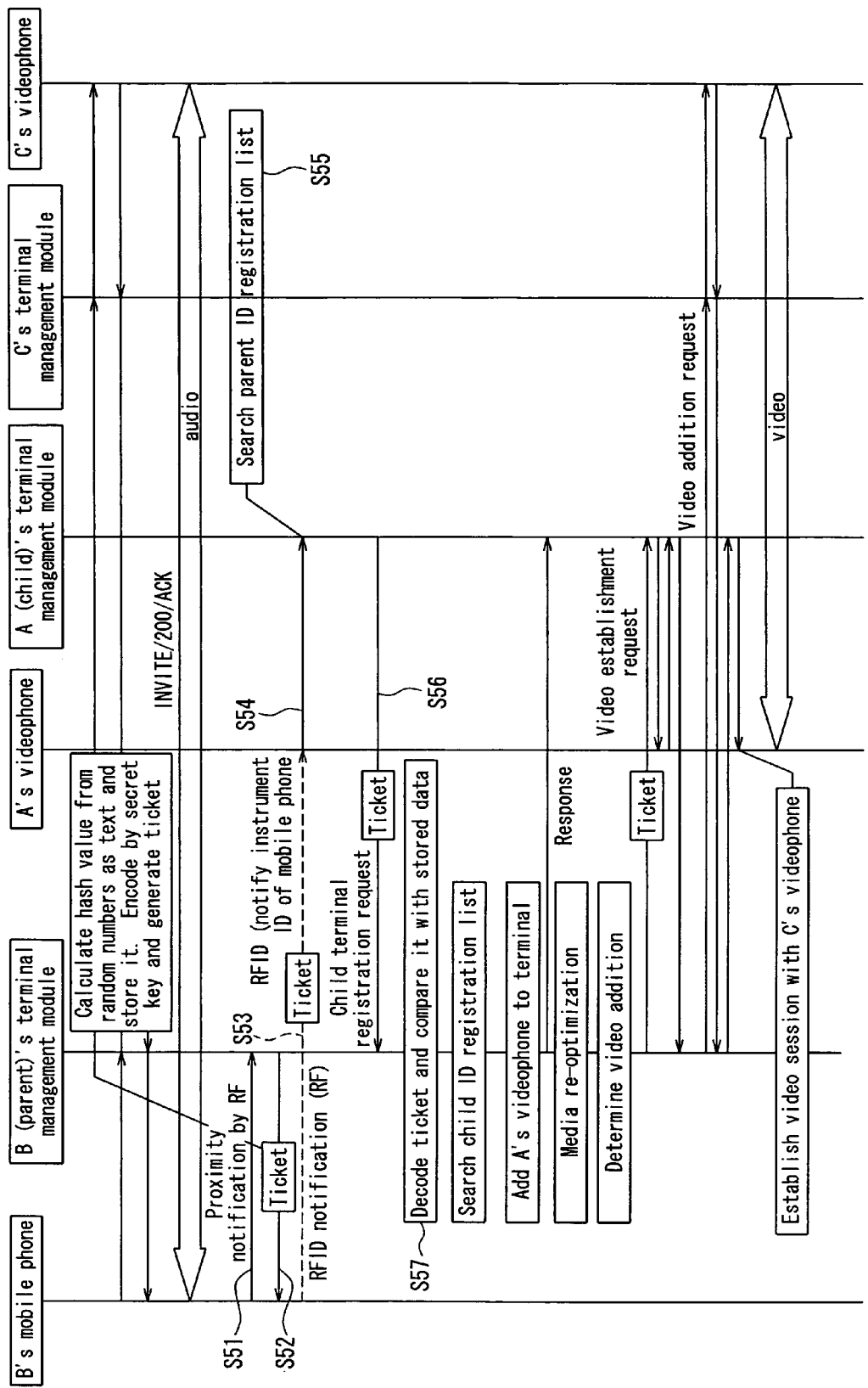
FIG. 10 is a chart showing an operation of the ubiquitous communication system according to Embodiment 4.

The following is a description of yet another embodiment of the present invention, with reference to FIGS. 9 and 10. The configurations similar to those in the above-described embodiments are given the same reference numerals, and the detailed description thereof will be omitted here.

The ubiquitous communication system according to the present embodiment includes a terminal management module 130 shown in FIG. 9. The terminal management module 130 has a configuration in which a ticket generating portion 18 for generating a ticket as secret information is further provided in the terminal management module 110 of Embodiment 2 or 3.

Here, similarly to Embodiment 2, assuming the state in which audio communication is carried out between the user B and the user C, the operation of the ubiquitous communication system according to the present embodiment will be described. Also, the proximity sensing system by RFID is provided between the user B's mobile phone and the user A's videophone.

When the user B's mobile phone detects that the user A's videophone is close to itself, it requests the terminal management module 130 of the user B to generate a ticket (S51 in FIG. 10). On receipt of this request, the user B's terminal management module 130 causes the ticket generating portion 18 to generate random numbers. The ticket generating portion 18, on the one hand, stores the generated random numbers as secret information and, on the other hand, encodes and sends them to the mobile phone as the ticket (S52).

The mobile phone sets a value of the above-noted ticket and its own instrument ID to the RFID tag. Then, when this mobile phone is brought close to the user A's videophone, the videophone reads out the ticket value and the instrument ID from the RFID tag of the mobile phone (S53) and sends the registration request to its own terminal management module 130 similarly to Embodiment 2 (S54).

The terminal management module 130 of the user A searches the parent registration list 12 (S55). Then, if the terminal ID contained in the instrument ID matches the terminal ID registered in the parent registration list 12, the terminal management module 130 attaches the above-noted ticket to the child terminal registration request and sends it to the terminal management module 130 of the user B (S56).

The terminal management module 130 of the user B decodes the ticket and checks whether the resultant character string matches that stored in the ticket generating portion 18 (S57). If it does, it can be confirmed that it indeed is the ticket that has been provided in S52. Since the sequence thereafter is the same as that after S4 shown in FIG. 6 in Embodiment 2, the description thereof will be omitted.

As described above, in accordance with the present embodiment, by attaching the encoded ticket to the instrument ID of the parent user's terminal and sending it to the child user, and decoding the returned ticket and comparing it with the stored random numbers at the time of setting the association, the terminal to which the association is to set can be confirmed. This makes it possible to prevent security problems such as tapping and unauthorized use more reliably.

In the above description, the embodiments of the present invention have been described. However, these embodiments do not limit the present invention but can be changed into various forms within the scope of the invention. For example, although the mobile phone and the videophone have been illustrated as exemplary terminals in the above description, how the terminals are embodied is not limited to them.

The present invention can be used as a terminal for achieving a ubiquitous computing, which provides a computer environment by various instruments at hand instead of a user-specific instrument, and an apparatus for managing the same or as a ubiquitous communication system constituted by these terminal and apparatus.

According to the present invention, it is possible to provide a ubiquitous communication system that can be used without changing a user ID etc. of a terminal of others or causing problems such as information leakage. Further, presetting the parent-child relationship and the terminal to be opened (borrowed) between users is advantageous to the parent user in that privacy leakage such as tapping can be prevented and to the child user in that unauthorized use of resources in which the other user uses his/her communication instrument without permission can be suppressed.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A terminal management apparatus realized by a computer for managing information of users of communication terminals, the terminal management apparatus comprising:
a memory communicating with the computer and storing information about an association between a terminal belonging to a user and other user or other terminal belonging to the other user, the memory including a parent registration list for storing a user ID of the other user who is allowed to use the terminal and a child registration list for storing a terminal ID of the other terminal which the user of the terminal is allowed to use;
an association setting portion provided for each group of terminals which the user is allowed to use, the association setting portion setting an association, when a user ID included in an association setting request received from the other terminal has been stored in the parent registration list, so as to allow the other user to use the terminal and sets an association, when a terminal ID included in an association setting request received from the other terminal has been stored in the child registration list, so as to allow the user of the terminal to use the other terminal, wherein a pre-created secret information is contained in the association setting request, the secret information is presented at a time of setting an association and compared with a stored secret information, thereby confirming that the association setting request is made by a proper terminal, and the terminal comprises a proximity sensing portion for sensing by a proximity wireless that the terminal and another terminal come close to each other and a request generating portion for, when the proximity sensing portion senses that the another terminal comes close, generating the association setting request containing instrument IDs obtained from the terminal and the another terminal and sending it to the association setting portion; and
a terminal management portion corresponding to each terminal, wherein the terminal management portion controls, when the association for allowing the other user to use the terminal is set, the terminal so as to allow the other user to carry out a communication using the terminal and controls, when the association for allowing the user of the terminal to use the other terminal is set, the other terminal so as to allow the user of the terminal to carry out a communication using the other terminal.

2. The terminal management apparatus according to claim 1,
wherein the memory contains, as the information about the terminals belonging to the each of the users, a media information describing media communicable by each of the terminals, and
the terminal management apparatus further comprises a call control portion that, taking a reception of an originating event from the other user as a cue, compares a media information of an originating terminal contained in the originating event and the media information in the memory, selects a terminal suitable as the originating terminal from among the terminals registered in the terminal management portion as the terminal belonging to the other user, and resets a call.

3. The terminal management apparatus according to claim 1, wherein the memory contains, as the information about the terminals belonging to the each of the users, a media information describing media communicable by each of the terminals, and
the terminal management apparatus further comprises a call control portion for, when an update on the memory is detected after establishing the communication, referring to the media information in the memory at this time and selecting a suitable terminal from among the terminals registered in the memory as the other terminal belonging to the other user, and resetting a call.

4. A terminal managed by the terminal management apparatus according to claim 2, wherein the terminal comprises a proximity sensing portion for sensing by a proximity wireless that the terminal and another terminal come close to each other and a request generating portion for, when the proximity sensing portion senses that the another terminal comes close, generating the association setting request containing instrument IDs obtained from the terminal and the another terminal and sending it to the association setting portion.

5. A terminal managed by the terminal management apparatus according to claim 3, wherein the terminal comprises a proximity sensing portion for sensing by a proximity wireless that the terminal and another terminal come close to each other and a request generating portion for, when the proximity sensing portion senses that the another terminal comes close, generating the association setting request containing instrument IDs obtained from the terminal and the another terminal and sending it to the association setting portion.

6. A terminal management apparatus realized by a computer for managing information of users of communication terminals, the terminal management apparatus comprising:
a memory configured to store information about an association between a terminal belonging to a user and other user or other terminal belonging to the other user, thereby executing controlling so that the user executes communications by using a terminal corresponding to retained information regarding a terminal belonging to the other user;
a parent registration list management portion provided to the memory for storing a user ID of the other user who is allowed to use the terminal;
a child registration list management portion provided to the memory for storing a terminal ID of the other terminal which the user of the terminal is allowed to use;
an association setting portion provided for each group of terminals which the user is allowed to use the association setting portion setting an association, when a user ID included in an association setting request received from the other terminal has been stored in the parent registration list, so as to allow the other user to use the terminal and sets an association, when a terminal ID included in an association setting request received from the other terminal has been stored in the child registration list, so as to allow the user of the terminal to use the other terminal, wherein a pre-created secret information is contained in the association setting request, the secret information is presented at a time of setting an association and compared with a stored secret information, thereby confirming that the association setting request is made by a proper terminal, and the terminal comprises a proximity sensing portion for sensing by a proximity wireless that the terminal and another terminal come close to each other and a request generating portion for, when the proximity sensing portion senses that the another terminal comes close, generating the association setting request containing instrument IDs obtained from the terminal and the another terminal and sending it to the association setting portion; and a terminal management portion corresponding to each terminal, wherein the terminal management portion controls, when the association is set for allowing the other user to use the terminal is set, the terminal so as to allow the other user to carry out a communication using the terminal and controls, when the association for allowing the user of the terminal to use the other terminal is set, the other terminal so as to allow the user of the terminal to carry out a communication using the other terminal.

7. The ubiquitous communication system according to claim 6, wherein the terminal comprises a proximity sensing portion for sensing by a proximity wireless that the terminal and another terminal come close to each other and a request generating portion for, when the proximity sensing portion senses that the another terminal comes close, generating the association setting request containing instrument IDs obtained from the terminal and the another terminal and sending it to the association setting portion.

8. A terminal management method realized by a computer for managing use of communication terminals, comprising:

storing, using the computer, an association of a terminal of a user with at least one other user and a respective terminal, a parent registration list identifying said at least one other user in relation to the terminal of the user and a child registration list identifying said respective terminal with the user;

setting an association responsive to a request identifying said at least one other user in the parent registration list and setting an association responsive to a request identifying the respective terminal with respect to the user of the terminal in the child registration list, said setting being provided for each group of terminals so as to allow the other user to use the terminal and sets an association, when a terminal ID included in an association setting request received from the other terminal has been stored in the child registration list, so as to allow the user of the terminal to use the other terminal, wherein a pre-created secret information is contained in the request, the secret information is presented at a time of setting an association and compared with a stored secret information, thereby confirming that the association setting request is made by a proper terminal, and the terminal comprises a proximity sensing portion for sensing by a proximity wireless that the terminal and another terminal come close to each other and a request generating portion for, when the proximity sensing portion senses that the another terminal comes close, generating the association setting request containing instrument IDs obtained from the terminal and the another terminal and causing the setting of the association; and controlling use of the terminal and said respective terminal corresponding to the at least one other user and the user based on corresponding association, said controlling controls, when the association for allowing the other user to use the terminal is set, the terminal so as to allow the other user to carry out a communication using the terminal and controls, when the association for allowing the user of the terminal to use the other terminal is set, the other terminal so as to allow the user of the terminal to carry out a communication using the other terminal.

* * * * *